(12) United States Patent
Carnehammar et al.

(10) Patent No.: US 10,527,126 B2
(45) Date of Patent: Jan. 7, 2020

(54) COMPOSITION, METHOD AND SYSTEM FOR BALANCING A ROTARY SYSTEM

(71) Applicants: Lars Bertil Carnehammar, Zurich (CH); Alvin Ronlan, Stockholm (SE)

(72) Inventors: Lars Bertil Carnehammar, Zurich (CH); Alvin Ronlan, Stockholm (SE)

(73) Assignee: Bertil Carnehammar, Zurich (CH)

( * ) Notice: Subject to any disclaimer, the term of this patent is extended or adjusted under 35 U.S.C. 154(b) by 635 days.

(21) Appl. No.: 14/886,065

(22) Filed: Oct. 18, 2015

(65) Prior Publication Data
US 2016/0252157 A1 Sep. 1, 2016

Related U.S. Application Data

(62) Division of application No. 13/395,531, filed as application No. PCT/EP2010/065125 on Oct. 8, 2010, now Pat. No. 9,162,538.

(30) Foreign Application Priority Data

Oct. 10, 2009 (DE) .......................... 10 2009 049 029
Dec. 15, 2009 (EP) ..................................... 09179225

(51) Int. Cl.
F16F 15/16 (2006.01)
F16F 15/31 (2006.01)
C09K 3/00 (2006.01)
C08L 71/02 (2006.01)
G01M 1/36 (2006.01)
B60C 19/00 (2006.01)

(52) U.S. Cl.
CPC .............. F16F 15/16 (2013.01); B60C 19/00 (2013.01); B60C 19/003 (2013.01); C08L 71/02 (2013.01); C09K 3/00 (2013.01); F16F 15/31 (2013.01); G01M 1/36 (2013.01); Y10T 74/2122 (2015.01); Y10T 74/2132 (2015.01)

(58) Field of Classification Search
None
See application file for complete search history.

(56) References Cited

U.S. PATENT DOCUMENTS

| | | |
|---|---|---|
| 2,673,838 A | 3/1954 | Franklin et al. |
| 3,463,551 A | 8/1969 | Clay |
| 3,747,660 A | 7/1973 | Tibbals |
| 3,779,723 A | 12/1973 | Fuller et al. |
| 3,920,061 A | 11/1975 | Japp et al. |
| 3,956,162 A | 5/1976 | Lautenberger |

(Continued)

FOREIGN PATENT DOCUMENTS

| | | |
|---|---|---|
| DE | 19857646 A1 | 6/2000 |
| DE | 19853691 A1 | 7/2000 |

(Continued)

OTHER PUBLICATIONS

Intellectual Property India Examination Report dated Dec. 18, 2018, in IN application No. 561/MUMNP/2012, which is a counterpart to U.S. Appl. No. 14/886,065.

Primary Examiner — Joseph D Anthony
(74) Attorney, Agent, or Firm — Robert S. Lelkes

(57) ABSTRACT

Compositions for balancing a rotary system are disclosed having hydrophobic particles distributed in thixotropic balancing substance. Further disclosed are methods for balancing a rotary system and rotary systems using the composition.

19 Claims, 3 Drawing Sheets

(56) References Cited

U.S. PATENT DOCUMENTS

| | | |
|---|---|---|
| 4,139,395 A | 2/1979 | Dunlap |
| 4,157,242 A | 6/1979 | Tarpley |
| 4,240,919 A | 12/1980 | Chapman |
| 4,304,281 A | 12/1981 | Kenney |
| 4,457,355 A * | 7/1984 | Winter .................. C22C 1/005 |
| | | 164/418 |
| 4,529,536 A | 7/1985 | Allen |
| 4,867,792 A * | 9/1989 | Ronlan .................. B60C 5/004 |
| | | 106/162.5 |
| 4,981,608 A | 1/1991 | Gunther |
| 5,028,267 A * | 7/1991 | Lane .................. C01B 33/1417 |
| | | 106/287.1 |
| 5,073,217 A | 12/1991 | Fogal |
| 5,083,596 A | 1/1992 | Kato et al. |
| 5,201,248 A * | 4/1993 | Ibe ...................... C08G 59/184 |
| | | 156/330 |
| 5,427,707 A | 6/1995 | Drapier et al. |
| 5,431,726 A * | 7/1995 | Ronlan .................. B60C 5/004 |
| | | 106/266 |
| 5,431,728 A | 7/1995 | Frouin et al. |
| 5,540,767 A | 7/1996 | Ronlan |
| 5,639,296 A | 6/1997 | Garino |
| 5,802,885 A | 9/1998 | Kim |
| 5,850,749 A | 12/1998 | Kim |
| 5,916,274 A | 6/1999 | Lee et al. |
| 6,082,151 A | 7/2000 | Wierzba et al. |
| 6,128,952 A | 10/2000 | Leblanc |
| 6,129,797 A | 10/2000 | Heffernan et al. |
| 6,334,964 B1 | 1/2002 | Cowman et al. |
| 6,547,983 B2 | 4/2003 | Iyengar |
| 7,368,024 B2 | 5/2008 | Majumdar et al. |
| 8,215,349 B2 | 7/2012 | Seitz |
| 2003/0158295 A1 | 8/2003 | Fukuda et al. |
| 2005/0151308 A1 | 7/2005 | Norville et al. |
| 2005/0159534 A1 * | 7/2005 | Ronlan .................. B60C 5/004 |
| | | 524/494 |
| 2007/0000407 A1 | 1/2007 | Leong |
| 2007/0117935 A1 | 5/2007 | Aten et al. |
| 2007/0137955 A1 | 6/2007 | Maranville et al. |
| 2008/0110212 A1 | 5/2008 | Kim et al. |
| 2010/0006195 A1 | 1/2010 | Seitz |
| 2010/0212811 A1 | 8/2010 | Seitz |
| 2010/0252174 A1 * | 10/2010 | Ronlan .................. B60C 5/004 |
| | | 156/74 |
| 2011/0129341 A1 | 6/2011 | Seitz |
| 2011/0162442 A1 * | 7/2011 | Ronlan .................. D06F 37/22 |
| | | 73/66 |
| 2011/0212265 A1 * | 9/2011 | Seitz ................ B29D 30/0633 |
| | | 427/299 |
| 2011/0254351 A1 | 10/2011 | Ronlan |
| 2012/0260766 A1 * | 10/2012 | Seitz .................... F16F 15/366 |
| | | 74/573.1 |

FOREIGN PATENT DOCUMENTS

| | | |
|---|---|---|
| EP | 0281252 A1 | 9/1988 |
| EP | 0557365 B1 | 9/1996 |
| GB | 1209696 A | 10/1970 |
| GB | 2074955 A | 11/1981 |
| JP | S56171302 U | 12/1981 |
| JP | H0712167 A | 1/1995 |
| JP | 2003056074 A | 2/2003 |
| WO | 2008009696 A1 | 1/2008 |
| WO | 2010003988 A1 | 1/2010 |

* cited by examiner

COMPOSITION, METHOD AND SYSTEM FOR BALANCING A ROTARY SYSTEM

FIELD OF THE INVENTION

Embodiments of the invention described herein relate generally to an improved balancing composition, more particularly an improved thixotropic balancing substance, for balancing a rotary system, such as a mechanical propulsion system of a vehicle, aircraft or watercraft, or a mechanical drive system of an article processing machine, and reducing vibration in the rotary system, and a corresponding method and system.

BACKGROUND OF THE INVENTION

Vibration negatively effects safety and comfort. With regard to safety, vibration has a direct influence on stability and may cause material fatigue and damage. A main source of vibration is any rotary system of a vehicle, aircraft, watercraft or article processing machine, for example. Examples of a rotary system comprise a mechanical propulsion system comprising an engine or motor system, a power transmission system and a wheel, comprising a tyre, rim and valve, of a vehicle, such as a car, a mechanical propulsion system comprising an engine system and a rotor system of an aircraft, such as a helicopter, a mechanical propulsion system comprising an engine or motor system, a power transmission system and a propeller of a watercraft, such as a cargo ship, and a mechanical drive system comprising a motor system and drum system of an article processing machine, such as a washing machine. Vibrations may comprise rotation-speed-dependent vibrations generally originating from the engine or motor system and speed-dependent vibrations generally originating from the power transmission system. Vibrations may damage rolling-element bearings, for example ball bearings or roller bearings, used, for example, as engine bearings, or seals.

Owing to wear and tear of the rotary system, vibration generally increases over time. In more detail, owing to wear and tear of a rotating element, it's centre of gravity (CofG) moves over time causing an imbalance causing vibration.

EP patent application 0 281 252 and corresponding U.S. Pat. No. 4,867,792 disclose a thixotropic tyre balancing composition having a yield stress value between 30 Pa and 260 Pa being capable of balancing tyres by being able to flow under the influence of the vibrations induced when a heavy spot on the tyre hits the road surface. The balancing composition distributes itself in a wheel assembly consisting of a tyre mounted on a rim and having a heavy spot.

EP patent application 0 557 365 and corresponding PCT patent application WO 1992/08775 disclose a tyre gel balancing composition having a storage modulus of between 3000 and 15000 Pa, preferably its storage modulus is about 9000 Pa, is capable of balancing tyres by being able to flow under the vibrations caused by imbalance in a wheel assembly. The composition preferably comprises a mixture of: 1) paraffinic oils, polybutene oils, polyesters or polyol ethers; 2) hydrophobic or hydrophilic fumed silica; 3) polyalkylmethacrylates, styrene-ethylene-propylene block copolymers or polyhydroxycarboxylic acid derivatives; and optionally corrosion inhibitors and antioxidants.

U.S. Pat. No. 5,431,726 discloses a tyre gel balancing composition having a Storage modulus of between 3000 and 15000 Pa and being capable of balancing tyres by being able to flow under the vibrations caused by imbalance in a wheel assembly.

DE patent application 198 57 646 discloses a method for balancing tyres by introducing a balancing substance inside the tyre, comprising placing a substance with definite properties, shape, geometry and weight inside the tyre; and moving to the point of imbalance by rotating the tyre. The method may also be used for balancing other rotating objects.

DE patent application 198 53 691 discloses a method for introducing tyre-balancing substance as internal circumferential gel bead. The substance characteristic, shape, weight, geometry and its deposition locations are defined. The internal surface of the tyre exhibits defined shape and geometry. One or more endless strands may be employed. Strand cross section may be circular, semicircular, flattened, triangular, quadrilateral or polygonal. The one or more strands are distributed over the entire circumference, or just part of it, or both types of distribution take place. Strand portions are applied opposite the valve, when mounted on the rim. They are applied at or away from the equatorial plane, symmetrically, or else asymmetrically. The substance is injected through the valve in set quantity. A gel with a defined viscosity, thixotropy, long term stability, and compatibility with the tyre's inner surface is used. The tyre has one or more circumferential grooves, optionally between beads, to accept the substance.

PCT patent application WO 2009/037314 discloses a method of processing a vehicle tyre and a thixotropic balancing substance comprising providing a first amount of the balancing substance to a first circumferential balancing area on an inner side of the vehicle tyre comprising distributing the first amount of the balancing substance on the first balancing area substantially uniformly; and a corresponding apparatus and system. In one embodiment a varnish layer comprising nanoparticles is provided on the first circumferential balancing area to increase the movability of the thixotropic balancing substance on the balancing area.

Thus, for balancing a rotary system, such as a vehicle wheel, a rotational element, such as a vehicle tyre, comprising a chamber and a circumferential balancing area, such as an inner liner, may be partially filled with an amount of a thixotropic balancing substance.

Further, the circumferential balancing area may be provided with a nanostructure. The nanostructure may be formed during production of the vehicle tyre, requiring non-standard, special equipment. If the vehicle tyre is a standard tyre, the nanostructure may provide, in an additional production step, by distributing a material, such as a varnish, comprising nanoparticles on the balancing area. However, the varnish may comprise a solvent, and the solvent may raise an environmental concern or cause a health and safety hazard during production. Even if the varnish is water-based and does not comprise a solvent, the additional production step requiring time and involving cost is necessary.

For these and other reasons, there is a need for the invention as set forth in the following in the embodiments.

SUMMARY OF THE INVENTION

It is an object of the invention to provide to an improved balancing composition for balancing a rotary system and reducing vibration in the rotary system, and a corresponding method and system.

This object is solved by the subject matter of the independent claims.

An aspect of the invention is a composition 240 for balancing a rotary system 200, comprising an amount of a thixotropic balancing substance and characterized by an amount of hydrophobic particles distributed in said amount of said thixotropic balancing substance. As a consequence, the hydrophobic particles reduce, that is diminish, inner cohesion of the thixotropic balancing substance by breaking-up hydrogen bonds, or at least partially replace the thixotropic balancing substance at a contact surface between the composition and a circumferential balancing area, or both. As a result, movability of the composition increases, and, therefore, the composition improves balancing, or reduces vibration or both.

Another aspect of the invention is a composition 240, wherein said amount of said thixotropic balancing substance ranges from approximately 90% by weight to approximately 99% by weight, or ranges from approximately 95% by weight to approximately 98% by weight, or is approximately 97% by weight; and said amount of said hydrophobic particles ranges from approximately 10% by weight to approximately 1% by weight, or ranges from approximately 5% by weight to approximately 2% by weight, or is approximately 3% by weight.

Another aspect of the invention is a composition 240, wherein sizes of said hydrophobic particles range from approximately 1 nm to approximately 100 µm, or range from approximately 10 nm to approximately 50 µm, or range from approximately 100 nm to approximately 20 µm, or range from approximately 1 µm to approximately 10 µm, or range from approximately 3 µm to approximately 5 µm, or are approximately 4 µm.

Another aspect of the invention is a composition 240, wherein a specific surface area of said hydrophobic particles ranges from approximately 1 m$^2$/g to approximately 50 m$^2$/g, or ranges from approximately 2 m$^2$/g to approximately 20 m$^2$/g, or ranges from approximately 5 m$^2$/g to approximately 10 m$^2$/g.

Another aspect of the invention is a composition 240, wherein surfaces of said hydrophobic particles comprise a fluorocarbon, for example a fluoropolymer, such as polytetrafluoroethylene (PTFE), fluorinated ethylene propylene copolymer (FEP), in particular tetrafluoroethylene hexafluoropropylene copolymer, perfluoroalkoxy (PFA) or ethylenetetrafluoroethylene copolymer (ETFE), or a silicone; or a combination thereof.

Another aspect of the invention is a composition 240, wherein cores of said hydrophobic particles comprise a fluorocarbon, for example a fluoropolymer, such as polytetrafluoroethylene (PTFE), fluorinated ethylene propylene copolymer (FEP), in particular tetrafluoroethylene hexafluoropropylene copolymer, perfluoroalkoxy (PFA) or ethylenetetrafluoroethylene copolymer (ETFE), or a silicone, or a metal, for example iron, or carbon; or a combination thereof.

Another aspect of the invention is a composition 240, wherein a density of said hydrophobic particles is higher than a density of said thixotropic balancing substance. As a consequence, during rotation a centrifugal force is stronger for the hydrophobic particles than for the thixotropic balancing substance, and a particle density of the hydrophobic particles in the composition increases towards the contact surface. As a further consequence, the hydrophobic particles further replace the thixotropic balancing substance at a contact surface. As a result, movability of the composition further increases, and, therefore, the composition improves balancing, or reduces vibration or both.

Another aspect of the invention is a composition 240, wherein the density of said hydrophobic particles ranges from approximately 1000 kg/m$^3$ to approximately 5000 kg/m$^3$, or ranges from approximately 2000 kg/m$^3$ to approximately 4000 kg/m$^3$, or is approximately 3000 kg/m$^3$.

Another aspect of the invention is a composition, wherein said hydrophobic particles are non-sticking, that is the hydrophobic particles attach neither to water and water-comprising substances nor to oil and oil-comprising substances.

Another aspect of the invention is a composition, wherein said hydrophobic particles are chemically inert.

Another aspect of the invention is a composition, wherein said hydrophobic particles have a friction coefficient in the range from approximately 0.05 to approximately 0.1.

Another aspect of the invention is a composition, wherein a weight body is in contact with said thixotropic balancing substance. As a consequence, the weight body may contribute to balancing of the rotary system, and as a result, the effect of the balancing may be improved, and the amount of said thixotropic balancing substance may be reduced.

Another aspect of the invention is a composition, wherein said weight body has, defined by a body size of said weight body, a body surface and a body weight, such that said weight body overcomes adhesion between said body surface and said thixotropic balancing substance when said thixotropic balancing substance is subjected to said vibration and changes in an agitated state. As a consequence, the body size ensures movability of the weight body in the composition, and as a result, the effect of the balancing may be improved.

Another aspect of the invention is a composition, wherein said weight body preferably is a ball. The body size corresponds with a diameter of the ball. The diameter may be determined by a ratio between the body surface according to $A=4 \pi r^2$ accounting for surface structure, that is roughness, and adhesion, and a body volume according to $V=4/3 \pi r^3$ accounting for body density and body weight. For increasing radius r, the body volume, and therefore body, weight increases faster than the body surface. As a consequence, movability of the weight body in the composition may be increased, and as a result, the effect of the balancing may be improved.

Another aspect of the invention is a composition, wherein said weight body comprises metal, for example steel, such as stainless steel. As a consequence, durability of the weight body may be improved, and as a result, maintenance work may be simplified and reduced.

A further aspect of the invention is a composition 240 for balancing a rotary system 200, comprising: an amount of a thixotropic balancing substance; characterized by an amount of nanoparticles distributed in said amount of said thixotropic balancing substance. As a consequence, the nanoparticles reduce, that is diminish, inner cohesion of the thixotropic balancing substance by breaking-up hydrogen bonds, or at least partially replace the thixotropic balancing substance at a contact surface between the composition and a circumferential balancing area, or both. As a result, movability of the composition increases, and, therefore, the composition improves balancing, or reduces vibration or both.

Another aspect of the invention is a composition 240, wherein said amount of said thixotropic balancing substance ranges from approximately 90% by weight to approximately 99% by weight, or ranges from approximately 95% by weight to approximately 98% by weight, or is approximately 97% by weight, and said amount of said nanoparticles ranges from approximately 10% by weight to approximately 1% by weight, or ranges from approximately 5% by weight to approximately 2% by weight, or is approximately 3% by weight.

Another aspect of the invention is a composition 240, wherein sizes of said nanoparticles range from approximately 1 nm to approximately 1000 nm, or range from approximately 2 nm to approximately 500 nm, or range from approximately 5 nm to approximately 200 nm, or range from approximately 10 nm to approximately 100 nm, or range from approximately 20 nm to approximately 50 nm, or are approximately 40 nm.

Another aspect of the invention is a composition 240, wherein a specific surface area of said nanoparticles ranges from approximately 1 m$^2$/g to approximately 50 m$^2$/g, or ranges from approximately 2 m$^2$/g to approximately 20 m$^2$/g, or ranges from approximately 5 m$^2$/g to approximately 10 m$^2$/g.

Another aspect of the invention is a composition 240, wherein said nanoparticles comprise a fluorocarbon, for example a fluoropolymer, such as polytetrafluoroethylene (PTFE), fluorinated ethylene propylene copolymer (FEP), in particular tetrafluoroethylene hexafluoropropylene copolymer, perfluoroalkoxy (PFA) or ethylene-tetrafluoroethylene copolymer (ETFE), or a silicone, or a metal, for example aluminium, copper, gold, iron, silver, titanium and zinc, or metal oxide, for example aluminium oxide, copper oxide, iron oxide, silver oxide and titanium oxide, semiconductor, for example cadmium selenide, cadmium telluride and silicon, or carbon, for example carbon black, carbon nanotubes, graphite and Fullerene.

Another aspect of the invention is a composition 240, wherein a density of said nanoparticles is higher than a density of said thixotropic balancing substance.

Another aspect of the invention is a composition 240, wherein the density of said nanoparticles ranges from approximately 1000 kg/m$^3$ to approximately 5000 kg/m$^3$, or ranges from approximately 2000 kg/m$^3$ to approximately 4000 kg/m$^3$, or is approximately 3000 kg/m$^3$.

Yet a further aspect of the invention is a method of reducing vibration in a rotary system 200, characterized by: distributing an amount of hydrophobic particles in an amount of a thixotropic balancing substance to form an amount of a composition 240; and providing a rotational element 110 comprising a chamber 120 having a fulcrum on a rotational axis 150 of said rotational element 110, comprising a circumferential balancing area 130 and being partially filled with at least a portion of said amount of said composition 240. As a consequence, the hydrophobic particles reduce, that is diminish, inner cohesion of the thixotropic balancing substance by breaking-up hydrogen bonds, or at least partially replace the thixotropic balancing substance at a contact surface between the composition and a circumferential balancing area, or both. As a result, movability of the composition increases, and, therefore, the composition improves balancing, or reduces vibration or both.

Another aspect of the invention is a method, further comprising: rotating said rotational element 110 about said rotational axis 150, such that said composition 240 liquefies and distributes itself along said circumferential balancing area 130, and an imbalance of said rotational element 110 is reduced.

Another aspect of the invention is a method, wherein said amount of said thixotropic balancing substance ranges from approximately 90% by weight to approximately 99% by weight, or ranges from approximately 95% by weight to approximately 98% by weight, or is approximately 97% by weight, and said amount of said hydrophobic particles ranges from approximately 10% by weight to approximately 1% by weight, or ranges from approximately 5% by weight to approximately 2% by weight, or is approximately 3% by weight.

Another aspect of the invention is a method wherein sizes of said hydrophobic particles range from approximately 1 nm to approximately 100 μm, or range from approximately 10 nm to approximately 50 μm, or range from approximately 100 nm to approximately 20 μm, or range from approximately 1 μm to approximately 10 μm, or range from approximately 3 μm to approximately 5 μm, or are approximately 4 μm.

Another aspect of the invention is a method, wherein a specific surface area of said hydrophobic particles ranges from approximately 1 m$^2$/g to approximately 50 m$^2$/g, or ranges from approximately 2 m$^2$/g to approximately 20 m$^2$/g, or ranges from approximately 5 m$^2$/g to approximately 10 m$^2$/g.

Another aspect of the invention is a method, wherein surfaces of said hydrophobic particles comprise a fluorocarbon, for example a fluoropolymer, such as polytetrafluoroethylene (PTFE), fluorinated ethylene propylene copolymer (FEP), in particular tetrafluoroethylene hexafluoropropylene copolymer, perfluoroalkoxy (PFA) or ethylene-tetrafluoroethylene copolymer (ETFE), or a silicone.

Another aspect of the invention is a method, wherein cores of said hydrophobic particles comprise a fluorocarbon, for example a fluoropolymer, such as polytetrafluoroethylene (PTFE), fluorinated ethylene propylene copolymer (FEP), in particular tetrafluoroethylene hexafluoropropylene copolymer, perfluoroalkoxy (PFA) or ethylene-tetrafluoroethylene copolymer (ETFE), or a silicone, or a metal, for example iron, or carbon.

Another aspect of the invention is a method, wherein a density of said hydrophobic particles is higher than a density of said thixotropic balancing substance.

Another aspect of the invention is a method, wherein the density of said hydrophobic particles ranges from approximately 1000 kg/m$^3$ to approximately 5000 kg/m$^3$, or ranges from approximately 2000 kg/m$^3$ to approximately 4000 kg/m$^3$, or is approximately 3000 kg/m$^3$.

Another aspect of the invention is a method, wherein said rotary system 200 is comprised in a vehicle, for example a car, and, optionally, said rotary system 200 is a wheel, an engine system or a transmission system of said vehicle.

Another aspect of the invention is a method, wherein said rotary system 200 is comprised in an aircraft, for example a helicopter, and, optionally, said rotary system 200 is an engine system or blades of said aircraft.

Another aspect of the invention is a method, wherein said rotary system 200 is comprised in a watercraft, for example a cargo ship, and, optionally, said rotary system 200 is an engine system or a transmission system of said aircraft.

Another aspect of the invention is a method, wherein said rotary system 200 is comprised in an article processing machine, for example a washing machine, and, optionally, said rotary system 200 is an engine system or article-receiving drum of said article processing machine.

Yet a aspect of the invention is a rotary system 200 for reducing vibration in said rotary system 200, characterized by a rotational element 110 comprising a chamber 120 having a fulcrum on a rotational axis 150 of said rotational element 110, comprising a circumferential balancing area 130 and being partially filled with an amount of a composition 240 comprising an amount of a thixotropic balancing substance and an amount of hydrophobic particles distributed in said amount of said thixotropic balancing substance.

Another aspect of the invention is a rotary system 200, wherein said amount of said thixotropic balancing substance ranges from approximately 90% by weight to approximately 99% by weight, or ranges from approximately 95% by weight to approximately 98% by weight, or is approximately 97% by weight, and said amount of said hydrophobic particles ranges from approximately 10% by weight to approximately 1% by weight, or ranges from approximately 5% by weight to approximately 2% by weight, or is approximately 3% by weight.

Another aspect of the invention is a rotary system 200, wherein sizes of said hydrophobic particles range from approximately 1 nm to approximately 100 µm, or range from approximately 10 nm to approximately 50 µm, or range from approximately 100 nm to approximately 20 µm, or range from approximately 1 µm to approximately 10 µm, or range from approximately 3 µm to approximately 5 µm, or are approximately 4 µm.

Another aspect of the invention is a rotary system 200, wherein a specific surface area of said hydrophobic particles ranges from approximately 1 $m^2/g$ to approximately 50 $m^2/g$, or ranges from approximately 2 $m^2/g$ to approximately 20 $m^2/g$, or ranges from approximately 5 $m^2/g$ to approximately 10 $m^2/g$.

Another aspect of the invention is a rotary system 200, wherein surfaces of said hydrophobic particles comprise a fluorocarbon, for example a fluoropolymer, such as polytetrafluoroethylene PTFE, fluorinated ethylene propylene copolymer FEP, in particular tetrafluoroethylene hexafluoropropylene copolymer, perfluoroalkoxy PFA or ethylene-tetrafluoroethylene copolymer ETFE, or a silicone.

Another aspect of the invention is a rotary system 200, wherein cores of said hydrophobic particles comprise a fluorocarbon, for example a fluoropolymer, such as polytetrafluoroethylene PTFE, fluorinated ethylene propylene copolymer FEP, in particular tetrafluoroethylene hexafluoropropylene copolymer, perfluoroalkoxy PFA or ethylene-tetrafluoroethylene copolymer ETFE, or a silicone, or a metal, for example iron, or carbon.

Another aspect of the invention is a rotary system 200, wherein a density of said hydrophobic particles is higher than a density of said thixotropic balancing substance.

Another aspect of the invention is a rotary system 200, wherein the density of said hydrophobic particles ranges from approximately 1000 $kg/m^3$ to approximately 5000 $kg/m^3$, or ranges from approximately 2000 $kg/m^3$ to approximately 4000 $kg/m^3$, or is approximately 3000 $kg/m^3$.

Another aspect of the invention is a rotary system 200, wherein said rotary system 200 is comprised in a vehicle, for example a car, and, optionally, said rotary system 200 is a wheel, an engine system or a transmission system of said vehicle.

Another aspect of the invention is a rotary system 200, wherein said rotary system 200 is comprised in an aircraft, for example a helicopter, and, optionally, said rotary system 200 is an engine system or blades of said aircraft.

Another aspect of the invention is a rotary system 200, wherein said rotary system 200 is comprised in a watercraft, for example a cargo ship, and, optionally, said rotary system 200 is an engine system or a transmission system of said aircraft.

Another aspect of the invention is a rotary system 200, wherein said rotary system 200 is comprised in an article processing machine, for example a washing machine, and, optionally, said rotary system 200 is an engine system or article-receiving drum of said article processing machine.

BRIEF DESCRIPTION OF THE SEVERAL VIEWS OF THE DRAWING(S)

While the specification concludes with claims particularly pointing out and distinctly claiming that which is regarded as the invention, a more particular description of the invention will be rendered by reference to specific embodiments thereof, which are depicted in the appended drawings, in order to illustrate the manner in which embodiments of the invention are obtained. Understanding that these drawings depict only typical embodiments of the invention, that are not necessarily drawn to scale, and, therefore, are not to be considered limiting of its scope, embodiments will be described and explained with additional specificity and detail through use of the accompanying drawings in which:

DETAILED DESCRIPTION OF THE INVENTION

Figure 1:
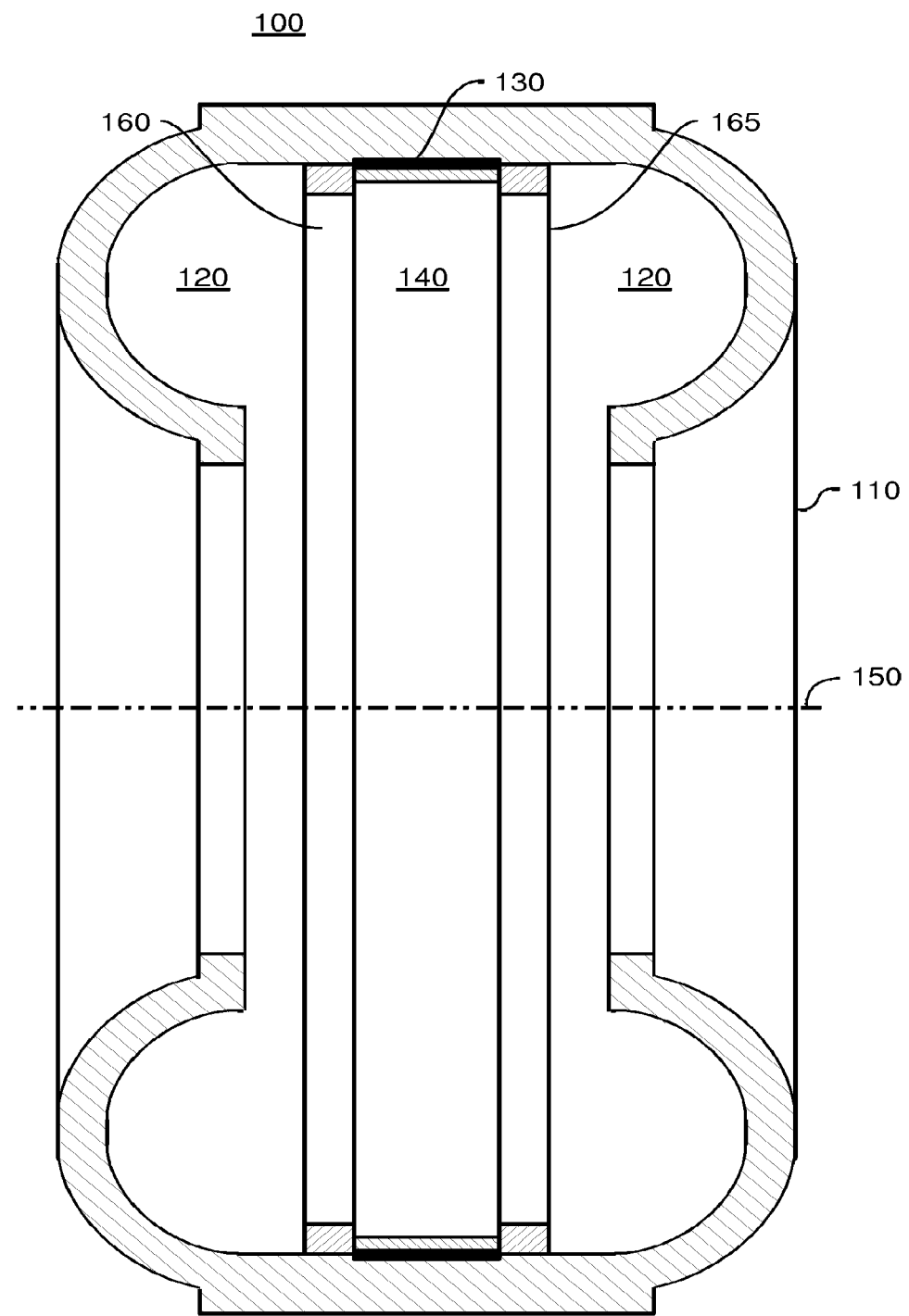
FIG. 1 shows a cross-sectional view of a conventional rotary system.

In the following detailed description of the embodiments, reference is made to the accompanying drawings which form a part hereof and show, by way of illustration, specific embodiments in which the invention may be practiced. In the drawings, like numerals describe substantially similar components throughout the several views. The embodiments are intended to describe aspects of the invention in sufficient detail to enable those of skill in the art to practice the invention. Other embodiments may be utilized and structural, logical or electrical changes or combinations thereof may be made without departing from the scope of the invention. Moreover, it is to be understood, that the various embodiments of the invention, although different, are not necessarily mutually exclusive. For example, a particular feature, structure or characteristic described in one embodiment may be included within other embodiments. Furthermore, it is to be understood, that embodiments of the invention may be implemented using different technologies. Also, the term "exemplary" is merely meant as an example, rather than the best or optimal. The following detailed description is, therefore, not to be taken in a limiting sense, and the scope of the invention is defined only by the appended claims, along with the full scope of equivalents to which such claims are entitled.

Reference will be made to the drawings. In order to show the structures of the embodiments most clearly, the drawings included herein are diagrammatic representations of inventive articles. Thus, actual appearance of the fabricated structures may appear different while still incorporating essential structures of embodiments. Moreover, the drawings show only the structures necessary to understand the embodiments. Additional structures known in the art have not been included to maintain clarity of the drawings. It is also to be understood, that features and/or elements depicted herein are illustrated with particular dimensions relative to one another for purposes of simplicity and ease of understanding, and that actual dimensions may differ substantially from that illustrated herein.

In the following description and claims, the terms "include", "have", "with" or other variants thereof may be used. It is to be understood, that such terms are intended to be inclusive in a manner similar to the term "comprise".

In the following description and claims, the terms "coupled" and "connected", along with derivatives such as "communicatively coupled" may be used. It is to be understood, that these terms are not intended as synonyms for each other. Rather, in particular embodiments, "connected" may be used to indicate, that two or more elements are in direct physical or electrical contact with each other. However, "coupled" may also mean that two or more elements are not in direct contact with each other, but yet still co-operate or interact with each other.

In the following description and claims, terms, such as "upper", "lower", "first", "second", etc., may be only used for descriptive purposes and are not to be construed as limiting. The embodiments of a device or article described herein can be manufactured, used, or shipped in a number of positions and orientations.

A composition for balancing a rotary system or reducing vibration in the rotary system according to the invention comprises an amount of a thixotropic balancing substance, and an amount of hydrophobic particles distributed in said amount of said thixotropic balancing substance. The composition may be made by mixing together its ingredients, if necessary under slight heating to below approximately 40° C. The hydrophobic particles may be incorporated into a prepared thixotropic balancing substance by high-shear mixing.

Rheological properties of a balancing substance are its Critical Yield Stress (CYS) and Elastic (Storage) Modulus (G'), both measured in the linear visco-elastic region, as well as its Yield Stress as determined in stress growth measurements and the relationship between its storage modulus (G') and its loss modulus (G"), measured by a frequency sweep.

Storage modulus (G') is a measure of the strength of the substance, that is the strength and the number of bonds between the molecules of the gel former.

Loss modulus (G") is a measure of a substance's ability to dissipate energy in the form of heat.

The relationship between G' and G" as measured in a frequency sweep is a structural characterization of a substance. The cross-over frequency is the frequency at which G" becomes greater than G'.

Of equal importance as the visco-elastic properties is a long term stability of the balancing substance in service, the performance at various temperatures of the substance, and the chemical inertness of the substance.

A balancing substance should remain functional during the life time of the balancing system and under the various conditions, in particular within a temperature range from approximately −50° C. or −30° C. to +90° C.

Furthermore, the balancing substance must not have any harmful effect on the balancing system and environment and should be disposable or recyclable.

The thixotropic balancing substance may be a thixotropic tyre balancing composition disclosed in EP patent application 0 281 252 and corresponding U.S. Pat. No. 4,867,792, having a yield stress value between 1 Pa and 260 Pa being capable of balancing tyres by being able to flow under the influence of the vibrations induced when a heavy spot on the tyre hits the road surface.

The thixotropic balancing substance may have a yield stress value greater than 2 Pa. However, owing to the lower yield stress value, a lower rotational acceleration may be necessary, especially if a rotational element is not in a vertical position.

In more detail, the thixotropic balancing substance may be a balancing gel comprising two components, namely, a base liquid and a gel former, and preferably fulfilling minimum criteria comprising, the regard to rheology, a storage modulus (G') between approximately 100 Pa and approximately 5000 Pa, a cross-over frequency (G">G') between approximately 1 Hz and approximately 40 Hz and a critical yield stress value greater than approximately 1 Pa; with regard to volatility, an evaporation loss of less than approximately 6% by weight after 10 hours at 99° C.; a pour point of the base liquid lower than approximately −15° C. according to the Standard Test Method for Pour Point of Petroleum Products, ASTM D97; with regard to separation stability, a separation of the base liquid of less than approximately 20% by weight after 12 hours at 300 000×g and 25° C.; and, with regard to chemical reactivity, substantial inertness, such as non-corrosiveness to metals and no effect on polymers, such as rubber. The balancing gel typically comprises, by weight, between approximately 75% and approximately 99%, for example between approximately 85% and approximately 97%, such as approximately 95% of the base liquid, and, correspondingly, between approximately 1% and approximately 25%, for example between approximately 3% and approximately 15%, such as approximately 5% of the gel former. The balancing gel may further comprise, preferably in minor amounts, a corrosion inhibitor, an anti-oxidant, a dye or a combination thereof.

The base liquid may, for example, comprise a polyalkylene glycol (PAG), such as a polypropylene glycol (PPG) or a polyethylene glycol (PEG); a combination, that is a mixture, of PAGs, such as a combination of a PPG and a PEG; a copolymer of ethylene oxide and propylene oxide; or a combination thereof.

The base liquid may comprise an alcohol-(ROH-)started polymer of oxypropylene groups having a generalized formula:

where R is hydrogen or an alkyl group, having one terminal hydroxyl group and being water-insoluble, such as products with a variety of molecular weights and viscosities marketed by DOW Chemical Company (www.dow.com) under the trade mark UCON LB Fluids.

The base liquid may, alternatively or additionally, comprise an alcohol-(ROH-)started linear random copolymer of ethylene oxide and propylene oxide having a generalized formula:

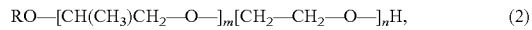

where R is hydrogen or an alkyl group.

The base liquid may, alternatively or additionally, comprise an alcohol-(ROH-)started random copolymer of ethylene oxide and propylene oxide preferably comprising approximately equal amounts, that is approximately 50%, by weight of oxyethylene groups and oxypropylene groups, having one terminal hydroxyl group and being water-soluble at ambient temperature, that is at temperatures below approximately 40° C., such as products with equal amounts by weight of oxyethylene groups and oxypropylene groups and with a variety of molecular weights and viscosities marketed by DOW Chemical Company under the trade mark UCON 50-HB Fluids. For example, the base liquid may, alternatively or additionally, comprise a butanol-started random copolymer of ethylene oxide and propylene oxide comprising equal amounts by weight of oxyethylene groups and oxypropylene groups with a numbered average molecular weight of 3930, a viscosity of approximately 1020 cSt at 40° C. and a viscosity grade of approximately 1000 according to ISO 3448, such as a product marketed by DOW Chemical Company under the trade mark UCON 50-HB-5100.

The base liquid may, alternatively or additionally, comprise a diol-started random copolymer of ethylene oxide and propylene oxide preferably comprising approximately 75% by weight oxyethylene groups and, correspondingly, approximately 25% by weight oxypropylene groups, having two terminal hydroxyl groups (R=H) and being water-soluble at temperatures below approximately 75° C., such as products with a variety of molecular weights and viscosities marketed by DOW Chemical Company under the trade mark UCON 75-H Fluids. For example, the base liquid may, alternatively or additionally, comprise a diol-started random copolymer of ethylene oxide and propylene oxide comprising 75% by weight oxyethylene groups and 25% by weight oxypropylene groups with a numbered average molecular weight of 6950 and a viscosity of approximately 1800 cSt at 40° C., such as a product marketed by DOW Chemical Company under the trade mark UCON 75-H-9500.

The base liquid may, alternatively or additionally, comprise an alcohol-(ROH-)started random copolymer of ethylene oxide and propylene oxide preferably comprising approximately 40% by weight of oxyethylene groups and, correspondingly, approximately 60% by weight oxypropylene groups and being water-soluble, such as products with a variety of molecular weights and viscosities marketed by DOW Chemical Company under the trade mark SYNALOX 40. For example, the base liquid may, alternatively or additionally, comprise an alcohol-started random copolymer of ethylene oxide and propylene oxide comprising 40% by weight of oxyethylene groups and 60% by weight oxypropylene groups with a numbered average molecular weight of 5300, a viscosity of 1050 cSt at 40° C. and a viscosity grade of approximately 1000 according to ISO 3448 such as a product marketed by DOW Chemical Company under the trade mark SYNALOX 40-D700.

The base liquid may, alternatively or additionally, comprise a diol-started random copolymer of ethylene oxide and propylene oxide preferably comprising approximately 50% by weight of oxyethylene and, correspondingly, approximately 50% by weight oxypropylene groups with a kinematic viscosity of 960-1160 cSt (or mm$^2$/s) at 40° C. ASTM D445 such as a product marketed by DOW Chemical Company under the trade mark SYNALOX 50-D700.

The gel former may comprise fumed silica, for example hydrophobic silica or hydrophilic silica, preferably having a BET (Brunauer, Emmett, Teller) surface area between approximately 50 m$^2$/g and approximately 400 m$^2$/g, for example a hydrophilic fumed silica having a BET surface area of 300 m$^2$/g, such as a product marketed by Evonik Industries (www.evonik.com) under the trade mark Aerosil A300.

The gelling effect of the gel formers on the oils is accomplished by the formation of a network of the molecules of the gel former through hydrogen bonding via hydroxy groups or via van-der-Waals attraction between segments molecules of the gel former. The number and the strength of these bonds determine the gel strength, and the ability of the gel to support a load (critical yield stress).

The thixotropic balancing substance may be a balancing gel comprising a balancing gel composition comprising 1) 85 to 97% by weight of a glycol ether component comprising one or more ethylene/propylene glycol copolymer ethers of the general formula (I) or the general (II) or mixtures thereof

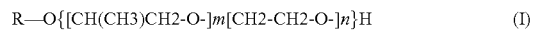

R—O{[CH(CH3)CH2-O-]$m$[CH2-CH2-O-]$n$}H          (I)

R1-(O—{[CH(CH3)CH2-O-]$m$[CH2-CH2-O-]$n$}H)2          (II)

wherein R is hydrogen or an alkyl group of 2-8 carbon atoms; R1 is an alkylene moiety of 2-8 carbon atoms in which the two substituents are not carried on the same carbon atom; m is the mole percentage of propylene glycol in the ethylene/propylene glycol copolymer moiety or moieties; and n is the mole percentage of ethylene glycol in the ethylene/propylene glycol copolymer moiety or moieties, wherein the ratio n:m is in the range from 35:65 to 80:20; each glycol copolymer compound having a number average molecular weight in the range of 2000-10000; and 2) 3 to 15% by weight of a fumed silica gel former; said balancing composition being visco-elastic and having a storage modulus (G') between 1500 Pa and 5000 Pa at 22° C., a loss modulus (G") smaller than the storage modulus up to a cross-over frequency of 10-40 Hz, and a Critical Yield Stress exceeding 2 Pa.

The number average molecular weight of the glycol ether component(s) may be in the range of 3000-10000. The ratio n:m may be in the range from 35:65 to 80:20, preferably in the range from 40:60 to 75:25, in particular from 40:60 to 60:40, such as 50:50. The fumed silica gel former may be a hydrophilic type fumed silica having a BET surface area of from 90 to 400 m$^2$/g, preferably from 200 to 300 m$^2$/g; or the fumed silica gel former is a hydrophobized type fumed silica having has a BET surface area of from 50 to 300 m$^2$/g, preferably from 250 to 350 m$^2$/g; or mixtures of such hydrophilic and hydrophobized type fumed silica gel formers. The glycol ether component(s) may exhibit a Viscosity Grade determined according to ISO3448 of above 500, preferably in the range of 800-1200.

In an embodiment of the invention, the ratio n:m of a copolymer of formula (I) is in the range from 40:60 to 75:25, such as from 40:60 to 60:40, in particular from 45:55 to 55:45, such as around 50:50. In another embodiment, the ratio n:m of a copolymer of formula (II) may be from 70:30 to 80:20, such as around 75:25.

In a preferred embodiment, the thixotropic balancing substance comprises 6.3±0.2% by weight, more preferably 6.3±0.1% by weight, of fumed silica gel former; and 1.0±0.3% by weight, preferably 1.0±0.2% by weight, more preferably 1.0±0.1% by weight of a copolymer of formula (II) having a ratio n:m from 70:30 to 80:20, more preferably around 75:25; and the balance being a copolymer of formula (I) having a ratio n:m from 45:55 to 55:45, such as around 50:50.

In another preferred embodiment, the thixotropic balancing substance comprises 6.5±0.2% by weight, more preferably 6.5±0.1% by weight, of fumed silica gel former; and 1.0±0.3% by weight, preferably 1.0±0.2% by weight, more preferably 1.0±0.1% by weight of a copolymer of formula (II) having a ratio n:m from 70:30 to 80:20, more preferably around 75:25; and the balance being a copolymer of formula (II) having a ratio n:m from 45:55 to 55:45, such as around 50:50.

The hydrophobic particles distributed in said thixotropic balancing substance particles reduce, that is diminish, inner cohesion of the thixotropic balancing substance by breaking-up hydrogen bonds, or at least partially replace the thixotropic balancing substance at a contact surface between the composition and a circumferential balancing area, or both. Relevant properties of hydrophobic particles comprise: a non-stick character, that is neither water and water-comprising substances nor oil and oil-comprising substances are to be wet by the hydrophobic particles, a friction coefficient is low, for example in the range from 0.05 to 0.10, a density is higher than a density of the thixotropic balancing substance, for example above 1000 kg/m$^3$, a particle size is small, for example in the range from 100 nm to 10 µm, a surface area is large, for example in the range from 1 m$^2$/g to 10 m$^2$/g (as determined by Nitrogen absorption), and chemical inertness. Examples of materials with these properties comprise fluorocarbons, such as fluoropolymers, for example polytetrafluoroethylene (PTFE), fluorinated ethylene propylene copolymer (FEP), in particular tetrafluoroethylene hexafluoropropylene copolymer, perfluoroalkoxy (PFA) or ethylene-tetrafluoroethylene copolymer (ETFE), and silicone.

The hydrophobic particles may comprise a fluoroadditive, for example free-flowing powdered fluoroadditive, preferably having a surface area between approximately 1 m$^2$/g and approximately 10 m$^2$/g, for example a free-flowing powdered PTFE having a surface area of 5-10 m$^2$/g or 1.5-3 m$^2$/g, such as products marketed by DuPont (www.dupont.com) under the trade marks Zonyl MP 1100 and Zonyl MP 1200, respectively. The hydrophobic particles may have a low surface energy.

The amount of the thixotropic balancing substance may range from approximately 90% by weight to approximately 99% by weight, or range from approximately 95% by weight to approximately 98% by weight, or be approximately 97% by weight, and the amount of the hydrophobic particles may range from approximately 10% by weight to approximately 1% by weight, or range from approximately 5% by weight to approximately 2% by weight, or be approximately 3% by weight;

Another composition for balancing a rotary system or reducing vibration in the rotary system according to the invention comprises an amount of a thixotropic balancing substance, and an amount of nanoparticles distributed in said amount of said thixotropic balancing substance. The composition may be made by mixing together its ingredients, if necessary under slight heating to below approximately 40° C. The nanoparticles may be incorporated into a prepared thixotropic balancing substance by high-shear mixing.

The nanoparticles distributed in said thixotropic balancing substance particles reduce, that is diminish, inner cohesion of the thixotropic balancing substance by breaking-up hydrogen bonds, or at least partially replace the thixotropic balancing substance at a contact surface between the composition and a circumferential balancing area, or both. Relevant properties of nanoparticles comprise: a particle size is small, for example between approximately 1 nm and approximately 1000 nm or between approximately 2 nm and approximately 500 nm or between approximately 5 nm and approximately 200 nm or between approximately 10 nm and approximately 100 nm or between approximately 20 nm and approximately 50 nm or approximately 40 nm, a surface area is large, for example between approximately 1 m$^2$/g and approximately 50 m$^2$/g. Examples of materials with these properties comprise fluorocarbons, such as fluoropolymers, for example polytetrafluoroethylene (PTFE), fluorinated ethylene propylene copolymer (FEP), in particular tetrafluoroethylene hexafluoropropylene copolymer, perfluoroalkoxy (PFA) or ethylene-tetrafluoroethylene copolymer (ETFE), silicone, metal, for example aluminium, copper, gold, iron, silver, titanium and zinc, metal oxide, for example aluminium oxide, copper oxide, iron oxide, silver oxide and titanium oxide, semiconductor, for example cadmium selenide, cadmium telluride and silicon, and carbon, for example carbon black, carbon nanotubes, graphite and Fullerene.

The amount of the thixotropic balancing substance may range from approximately 90% by weight to approximately 99% by weight, or range from approximately 95% by weight to approximately 98% by weight, or be approximately 97% by weight, and the amount of the nanoparticles may range from approximately 10% by weight to approximately 1% by weight, or range from approximately 5% by weight to approximately 2% by weight, or be approximately 3% by weight;

FIG. 1 shows a cross-sectional view of a conventional rotary system 100, such as a vehicle wheel. The rotary system 100 comprises a rotational element 110, such as a vehicle tyre. The rotational element 110 comprises a chamber 120 having a fulcrum on a rotational axis 150, comprises a circumferential balancing area 130, such as an inner liner of the vehicle tyre, and is partially filled with an amount of a conventional thixotropic balancing substance 140. The circumferential balancing area 130 may, as shown, be situated in center on the inner liner. Alternatively, the circumferential balancing area 130 may be situated on a side or on an edge.

The circumferential balancing area 130 may comprise a nanostructure for improving movability and flow of the thixotropic balancing substance 140, said nanostructure being, for example, formed by a material, such as a varnish, comprising nanoparticles, or imprinted on said circumferential balancing area 130. The rotational element 110 may further comprise a delimiter 160 for defining a border of the balancing area 130. The rotational element 110 may further comprise another delimiter 165 for defining another border of the balancing area 130.

Figure 2:
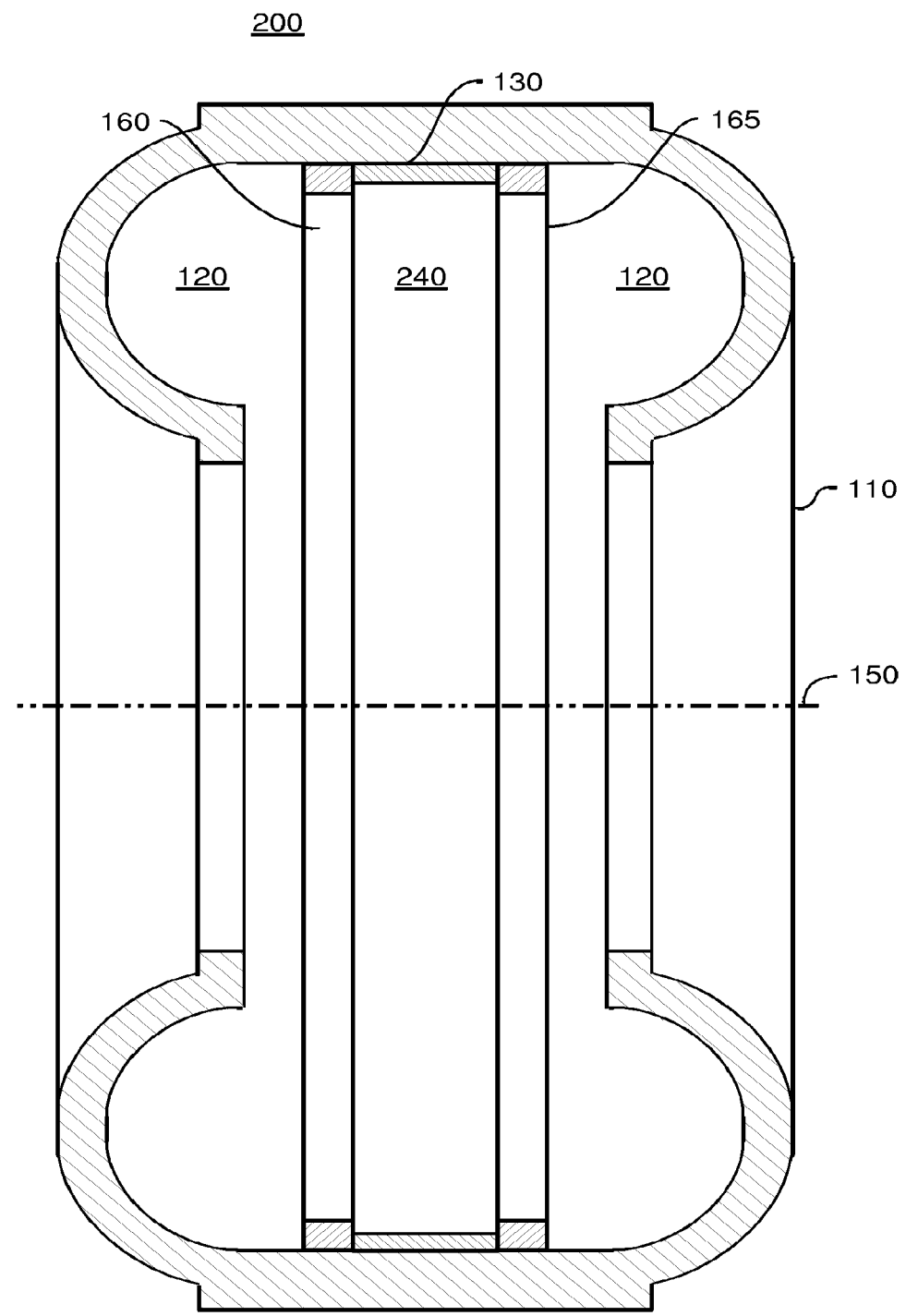
FIG. 2 shows a cross-sectional view of a rotary system according to an embodiment of the invention.

FIG. 2 shows a cross-sectional view of a rotary system system 200, such as a vehicle wheel, according to an embodiment of the invention. The rotary system 200 comprises a rotational element 110, such as a vehicle tyre. The rotational element 110 comprises a chamber 120 having a fulcrum on a rotational axis 150, comprises a circumferential balancing area 130, such as an inner liner of the vehicle tyre, and is partially filled with an amount of a composition 240 according to an embodiment of the invention. The composition for balancing the rotary system or reducing vibration in the rotary system comprises an amount of the thixotropic balancing substance, and an amount of the hydrophobic particles distributed in the amount of the thixotropic balancing substance. Alternatively, the composition comprises an amount of the thixotropic balancing substance, and an amount of the nanoparticles distributed in the amount of the thixotropic balancing substance.

The rotational element 110 may further comprise a delimiter 160 another delimiter 165 as described with reference to FIG. 1.

The invention may be applied to any rotary system 200 comprising a rotational element being rotatable about a rotational axis. For example, the rotary system 200 may be a motor system, an engine system or a transmission system, and the rotational element 110 may be a shaft, for example a driveshaft, such as a propeller shaft. The chamber 120 may be situated in a hollow shaft or tubular shaft, and extend substantially fully along the hollow shaft or tubular shaft.

Further, the invention may be applied to a rotary system of a real vehicle, such as a car in real life, aircraft, watercraft, article processing machine or the like as well as a scale vehicle, such as a model car, aircraft, watercraft, article processing machine or the like.

A series of tests was performed for determining and comparing lengths of travel over time of a conventional thixotropic balancing substance and a composition for balancing a rotary system or reducing vibration in the rotary system according to an embodiment of the invention.

For all tests, completely new vehicle tyres "Goodyear Excellence 245/45 R18" were used as rotational elements, and inner liners of the vehicle tyre were used as circumferential balancing areas. For tests #1 to #4 denoted as "untreated inner liner" the vehicle tyres were used without any change to the inner liners, that is surfaces of the vehicle tyres and inner liners comprised residual release agents from production of the vehicle tyres. For test #5 denoted as "coated inner liner" the inner liner of the vehicle tyre was coated with a solvent-based varnish comprising nanoparticles to provide a nanostructure on the circumferential balancing area.

Further, foam strips were applied to the inner liners as delimiters and sealed with silicone.

For each test, an amount of 75 grams of a balancing substance or a composition according to an embodiment of the invention was applied to the inner liner along a length of 10.0 cm. For tests #1, #3 and #5, a thixotropic balancing substance comprising 92.7% by weight of UCON 50-HB-5100 and 1% by weight of UCON 75-HB-9500 as base liquid and 6.3% by weight of Aerosil A 300 as gel former was used, as described in European patent application No. 08168913.5 and corresponding PCT patent application No. PCT/EP2009/065058. For tests #2 and #4, a composition comprising 97% by weight of the thixotropic balancing substance and 3% by weight of a free-flowing powdered PTFE, having a particle size distribution of 10%<0.3 µm, average 4 µm, 90%<8 µm and a surface area of 5-10 m²/g, and being marketed by DuPont under the trade mark Zonyl MP 1100, was used.

All vehicle tyres were mounted to rims to form vehicle wheels, and the rims were, in turn, mounted to a test equipment. All vehicle wheels were measured in the same way with the same procedure. For all tests, the vehicle wheels were rotated, and speed was increased to 130 km/h. For all tests, the length of the composition distribution in centimetres on the inner liner of the vehicle tyre was measured after 5 minutes and after 35 minutes.

Table 1 shows a comparison of lengths of the composition distributions in centimetres (cm) on the inner liner of the vehicle tyre as a function of time in minutes (min) for different compositions, different inner liner configurations and different combinations thereof.

Figure 3:
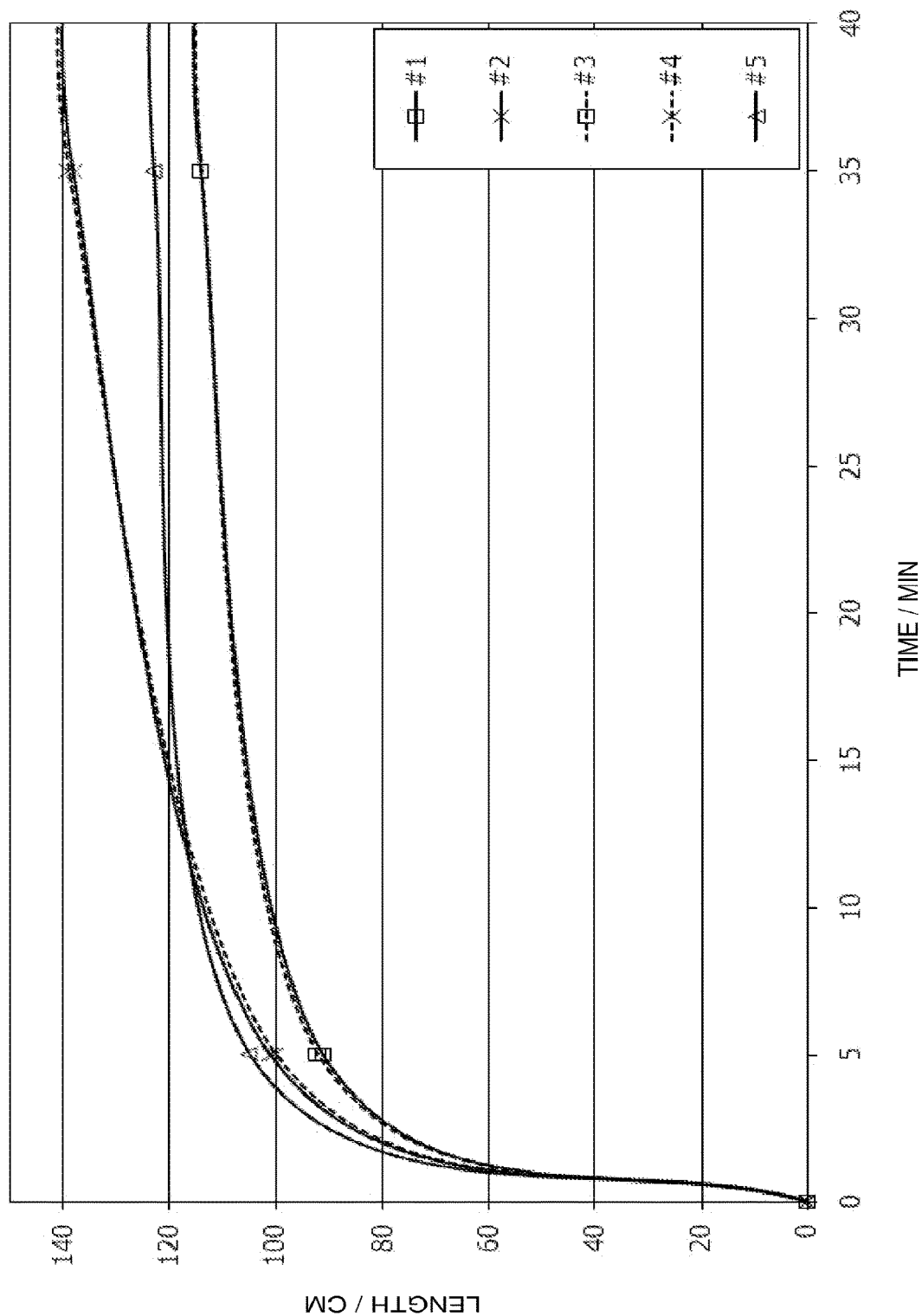
FIG. 3 shows a comparison of lengths of the composition distributions in centimetres on an inner liner of a vehicle tyre as a function of time in minutes for different compositions, different inner liner configurations and different combinations thereof.

FIG. 3 shows a graphical representation of the comparison of lengths of the composition distributions in centimetres (cm) on the inner liner of the vehicle tyre as a function of the time in minutes (min) for different compositions, different inner liner configurations and different combinations thereof. FIG. 3 shows measured data points with fitted curves.

In tests #1 and #3 indicated in FIG. 3 by outlined square markers and a solid line or a dashed line, respectively, the amounts of the plain balancing substance were applied to the untreated inner liner.

In tests #2 and #4 indicated in FIG. 3 by cross markers and a solid line or a dashed line, respectively, the amounts of the composition according to an embodiment of the invention were applied to the untreated inner liner.

In test #5 indicated in FIG. 3 by outlined triangle markers and a solid line, the amount of the plain balancing substance was applied to the coated inner liner As can be seen from a comparison of test #1 with test #3 and another comparison of test #2 with test #4 in FIG. 3, the tests generate for same conditions, that is a particular composition and a particular configuration, very similar results.

Further, as can be seen from a comparison of tests #2 and #4 with tests #1 and #3, the length of distribution of the composition according to the embodiment of the invention on the untreated inner liner is consistently greater than the length of distribution of the plain balancing substance on the untreated inner liner. Thus, the composition according to an embodiment of the invention has an improved performance, that is flowing behaviour, in comparison with a plain thixotropic balancing substance; in particular, it is significantly more agile.

Furthermore, as can be seen from a comparison of tests #2 and #4 with test #5, while the length of distribution of the composition according to the embodiment of the invention on the untreated inner liner is initially smaller than the length of distribution of the plain balancing substance on the coated inner liner, after approximately 12 min the length of distribution of the composition according to the embodiment of the invention on the untreated inner liner is larger than the length of distribution of the plain balancing substance on the coated inner liner. Thus, the composition according to an embodiment of the invention also has an improved performance, that is flowing behaviour, in comparison with a plain thixotropic balancing substance on the coated inner liner.

TABLE 1

Balancing Substance Formulations (in % by weight)

| | Test | | | | |
|---|---|---|---|---|---|
| | #1 | #2 | #3 | #4 | #5 |
| | | | Substance | | |
| | plain | with 3% | plain | with 3% | plain |
| | | | Inner liner | | |
| Time/ min | untreated Length/ cm | untreated Length/ cm | untreated Length/ cm | untreated Length/ cm | coated Length/ cm |
| 0 | 0 | 0 | 0 | 0 | 0 |
| 5 | 91 | 101 | 92 | 100 | 105 |
| 35 | 114 | 138 | 114 | 139 | 123 |

Furthermore, a rotary system comprising a composition according to an embodiment of the invention has an improved performance in comparison with a rotary system comprising a plain thixotropic balancing substance and a circumferential balancing area provided with a nanostructure. Thus, the rotary system comprising a composition according to an embodiment of the invention, and having a reduced complexity, may replace and even outperform the rotary system comprising a plain thixotropic balancing substance and a circumferential balancing area provided with a nanostructure.

The composition may further comprise a weight body (not shown) being in contact with the thixotropic balancing substance and contributing to balancing of the rotary system. The weight body has, defined by a body size of the weight body, a body surface and a body weight, such that the weight body overcomes adhesion between the body surface and the thixotropic balancing substance when the thixotropic balancing substance is subjected to the vibration and changes into an agitated state. The body size ensures movability of the weight body in the composition with the thixotropic balancing substance therein. The weight body may be a ball. The body size corresponds with a diameter of the ball. The diameter may be determined by a ratio between the body surface according to:

$$A = 4\pi r^2, \quad (3)$$

where r is a radius of the ball, accounting for surface structure, that is roughness, and adhesion, and a body volume according to:

$$V = 4/3 \pi r^3, \quad (4)$$

where r is a radius of the ball, accounting for body density and body weight. For increasing radius r, the volume, and therefore body weight, increases faster than the body surface, and movability of the weight body in the composition increases. The weight body may comprise metal, for example steel, such as stainless steel.

Embodiments of the inventions comprise a corresponding method.

Embodiments of the inventions comprise a corresponding system, possibly comprising a number of rotational elements according to the invention.

Although specific embodiments have been illustrated and described herein, it will be appreciated by those of ordinary skill in the art, that any arrangement which is calculated to achieve the same purpose may be substituted for the specific embodiments shown. It is to be understood, that the above description is intended to be illustrative and not restrictive. This application is intended to cover any adaptations or variations of the invention. Combinations of the above embodiments and many other embodiments will be apparent to those of skill in the art upon reading and understanding the above description. The scope of the invention includes any other embodiments and applications in which the above structures and methods may be used. The scope of the invention is, therefore, to be determined with reference to the appended claims, along with the full scope of equivalents to which such claims are entitled.

The invention claimed is:

1. A rotary system (200) for reducing vibration in said rotary system (200) comprising a rotational element (110), wherein the rotational element comprises a chamber (120) having a fulcrum on a rotational axis (150) of said rotational element (110) comprising a circumferential balancing area (130) and being partially filled with an amount of a composition (240) comprising an amount of a thixotropic balancing substance and an amount of hydrophobic particles distributed in said amount of said thixotropic balancing substance,
wherein said hydrophobic particles have
   surfaces comprising fluorocarbon,
   cores comprising a fluorocarbon, a silicone, a metal, or carbon, or
   a specific surface area in the range from approximately 2 m²/g to approximately 20 m²/g.

2. The rotary system (200) of claim 1, wherein:
said amount of said thixotropic balancing substance is in the range from approximately 90% by weight to approximately 99% by weight and said amount of said hydrophobic particles is in the range from approximately 10% by weight to approximately 1% by weight or
said hydrophobic particles have sizes in the range from approximately 1 nm to approximately 100 µm;
said hydrophobic particles have cores comprising a fluorocarbon, a silicone, a metal, or carbon;
said thixotropic balancing substance has a density and said hydrophobic particles have a density greater than the density of said thixotropic balancing substance;
said hydrophobic particles have a density in the range from approximately 1000 kg/m³ to approximately 5000 kg/m³; or
a combination of two or more of these features.

3. The rotary system (200) of claim 1, wherein:
said rotary system (200) is comprised in a vehicle and, optionally, said rotary system (200) is a wheel, an engine system or a transmission system of said vehicle;
said rotary system (200) is comprised in an aircraft and, optionally, said rotary system (200) is an engine system or blades 30 of said aircraft;
said rotary system (200) is comprised in a watercraft and, optionally, said rotary system (200) is an engine system or a transmission system of said watercraft; or
said rotary system (200) is comprised in an article processing machine and, optionally, said rotary system (200) is an article-receiving drum of said article processing machine.

4. The rotary system (200) of claim 1, wherein said hydrophobic particles have surfaces comprising fluorocarbon and the fluorocarbon is a fluoropolymer.

5. The rotary system (200) of claim 4, wherein the fluoropolymer is polytetrafluoroethylene (PTFE), fluorinated ethylene propylene copolymer (FEP), perfluoroalkoxy (PFA) or ethylene-tetrafluoroethylene copolymer (ETFE).

6. The rotary system (200) of claim 4, wherein the fluoropolymer is tetrafluoroethylene hexafluoropropylene copolymer.

7. The rotary system (200) of claim 1, wherein said hydrophobic particles have cores comprising a fluorocarbon, a silicone, a metal, or carbon.

8. The rotary system (200) of claim 4, wherein said hydrophobic particles have cores comprising a fluorocarbon, a silicone, a metal, or carbon.

9. The rotary system (200) of claim 5, wherein said hydrophobic particles have cores comprising a fluorocarbon, a silicone, a metal, or carbon.

10. The rotary system (200) of claim 1, wherein
said amount of said thixotropic balancing substance ranges from 95% by weight to approximately 98% by weight; and
said amount of said hydrophobic particles ranges from 5% by weight to 2% by weight.

11. The rotary system (200) of claim 4, wherein
said amount of said thixotropic balancing substance ranges from 95% by weight to approximately 98% by weight; and
said amount of said hydrophobic particles ranges from 5% by weight to 2% by weight.

12. The rotary system (200) of claim 1, wherein:
sizes of said hydrophobic particles range from approximately 10 nm to approximately 50 µm; or
a specific surface area of said hydrophobic particles ranges from approximately 2 m²/g to approximately 20 m²/g; or
both.

13. The rotary system (200) of claim 4, wherein:
sizes of said hydrophobic particles range from approximately 10 nm to approximately 50 µm; or
a specific surface area of said hydrophobic particles ranges from approximately 2 m²/g to approximately 20 m²/g; or
both.

14. The rotary system (200) of claim 1, wherein:
a density of said hydrophobic particles is higher than a density of said thixotropic balancing substance;
the density of said hydrophobic particles ranges from approximately 1000 kg/m$^3$ to approximately 5000 kg/m$^3$; or
both.

15. The rotary system (200) of claim 4, wherein:
a density of said hydrophobic particles is higher than a density of said thixotropic balancing substance;
the density of said hydrophobic particles ranges from approximately 1000 kg/m$^3$ to approximately 5000 kg/m$^3$; or
both.

16. A method of reducing vibration in a rotary system (200) comprising:
distributing an amount of a composition (240) comprising an amount of a thixotropic balancing substance and an amount of hydrophobic particles distributed in said amount of said thixotropic balancing substance; and
providing a rotational element (110) comprising a chamber (120) having a fulcrum on a rotational axis (150) of said rotational element (110) comprising a circumferential balancing area (130) and being partially filled with at least a portion of said amount of said composition (240),
wherein the hydrophobic particles have
surfaces comprising fluorocarbon,
cores comprising a fluorocarbon, a silicone, a metal, or carbon, or
a specific surface area in the range from approximately 2 m$^2$/g to approximately 20 m$^2$/g.

17. The method of claim 16 further comprising:
rotating said rotational element (110) about said rotational axis (150), such that said composition (240) liquefies and distributes itself along said circumferential balancing area (130), and an imbalance of said rotational element (110) is reduced.

18. The method of claim 16, wherein:
said amount of said thixotropic balancing substance is in the range from approximately 90% by weight to approximately 99% by weight and said amount of said hydrophobic particles is in the range from approximately 10% by weight to approximately 1% by weight;
said hydrophobic particles have sizes in the range from approximately 1 nm to approximately 100 μm;
said hydrophobic particles have cores comprising a fluorocarbon, a silicone, a metal, or carbon;
said the thixotropic balancing substance has a density and the hydrophobic particles have a density greater than the density of said thixotropic balancing substance;
aid hydrophobic particles have a density in the range from approximately 1000 kg/m$^3$ to approximately 5000 kg/m$^3$; or
a combination of two or more of these features.

19. The method of claim 16, wherein:
said rotary system (200) is comprised in a vehicle and, optionally, said rotary system (200) is a wheel, an engine system or a transmission system of said vehicle;
said rotary system (200) is comprised in an aircraft, and, optionally, said rotary system (200) is an engine system or blades of said aircraft;
said rotary system (200) is comprised in a watercraft and, optionally, said rotary system (200) is an engine system or a
transmission system of said aircraft; or
said rotary system (200) is comprised in an article processing machine and, optionally, said rotary system (200) is an article-receiving drum of said article processing machine.

* * * * *